(12) United States Patent
Barrett

(10) Patent No.: US 6,883,036 B1
(45) Date of Patent: Apr. 19, 2005

(54) SYSTEM AND METHOD FOR MANAGING NETWORK DIRECTORIES

(75) Inventor: John H. Barrett, Birmingham, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 849 days.

(21) Appl. No.: 09/888,751

(22) Filed: Jun. 25, 2001

(51) Int. Cl.[7] .............................. G06F 15/16; G06F 7/00
(52) U.S. Cl. ............................ 709/248; 707/204; 714/4
(58) Field of Search ........................... 709/248; 707/201, 707/203, 204; 714/4

(56) References Cited

U.S. PATENT DOCUMENTS

| | | | |
|---|---|---|---|
| 6,272,648 B1 * | 8/2001 | Findlay et al. .................. | 714/4 |
| 6,377,950 B1 * | 4/2002 | Peters et al. .................... | 707/10 |
| 6,477,543 B1 * | 11/2002 | Huang et al. ................... | 707/200 |
| 6,484,177 B1 * | 11/2002 | Van Huben et al. ........... | 707/10 |
| 6,708,187 B1 * | 3/2004 | Shanumgam et al. ........ | 707/201 |
| 2001/0042073 A1 * | 11/2001 | Saether et al. ............... | 707/203 |
| 2002/0178138 A1 * | 11/2002 | Ender et al. ................... | 707/1 |

OTHER PUBLICATIONS

"Novell Controls for ActiveX and Microsoft Migrating Directory Entries between NDS LDAP Directories Using Worksheets," printed from http://developer.novell.com/research/appnotes/2000/august/07/a000807.htm on Oct. 31, 2001.

"What is PerLDAP?," printed from http://developer.netscape.com/docs/articles/directory/perldap_central.html on Oct. 31, 2001.

"LDAP Linux HOWTO: Introduction," printed from http://www.linux.org/docs/ldp/howto/LDAP-HOWTO-1.htm on Oct. 31, 2001.

* cited by examiner

Primary Examiner—Krisna Lim
(74) Attorney, Agent, or Firm—Potomac Patent Group PLLC

(57) ABSTRACT

A system and method for synchronizing network directories. The first network directory is affiliated with a first application having entries native to the first application and the second network directory is affiliated with a second application and having entries native to the second application. An entry native to the first application is non-native to the second application and an entry native to the second application is non-native to the first application. According to one embodiment, the system includes an entry sorting module for sorting entries of the first and second directories based on the native application of the entry and a synchronization module in communication with the entry sorting module for updating entries in at least one of the first and second directories based on whether an entry native to the first application resides in the first directory.

27 Claims, 4 Drawing Sheets

SYSTEM AND METHOD FOR MANAGING NETWORK DIRECTORIES

BACKGROUND OF THE INVENTION

1. Field of Invention

The present invention relates generally to managing directories and, more particularly, to systems and methods for synchronizing network directories.

2. Description of the Background

Today's computer networks run multiple operating systems and messaging platforms, each with its own directory of user and resource information. Managing these enterprise directories has become one of the system administrators' biggest burdens, and sharing such diverse directory information has been one of the industry's biggest challenges. Introduction of the Lightweight Directory Access Protocol (LDAP) has helped to streamline administration of these directories and improve allocation of network resources.

LDAP is a TCP/IP based open-standard protocol for accessing information services. An LDAP-enabled directory is arranged in a hierarchical tree-like structure that exchanges data via the protocol defined as LDAP. Through its hierarchical structure, LDAP-enabled directories, like databases, are specially designed to give quick responses to high-volume lookup or search operations.

Despite these advancements in directory management techniques, some system administrators must integrate messaging platforms that support LDAP with those that either do not support LDAP or that do so inefficiently. Hewlett Packard's OpenMail® B.05.10 is one example of a messaging platform where it is more efficient to use OpenMail's native directory structure rather than attempting to use LDAP. OpenMail® uses a flat structure like a telephone directory while LDAP is designed for a hierarchical directory. In a network running OpenMail® and an LDAP-enabled application like Microsoft Exchange, OpenMail® users cannot access user attribute information for Exchange users. Likewise, Exchange users cannot access the same information for OpenMail® users. None of the users, therefore, has access to a complete address book.

A lack of integration between these directories burdens end users with maintaining an up-to-date list of email addresses and other necessary user attribute information for non-native users. One possible solution is to have system administrators update each address book periodically to reflect all OpenMail® and Exchange users. This approach, however, is repetitive and inefficient. Ideally, users need access to an up-to-date global address book that lists all users and minimizes the burden on system administrators.

SUMMARY OF THE INVENTION

The present invention is directed to a system for managing first and second network directories. The first network directory is affiliated with a first application having entries native to the first application and the second network directory is affiliated with a second application and having entries native to the second application. An entry native to the first application is non-native to the second application and an entry native to the second application is non-native to the first application. According to one embodiment, the system includes an entry sorting module for sorting entries of the first and second directories based on the native application of the entry and a synchronization module in communication with the entry sorting module for updating entries in at least one of the first and second directories based on whether an entry native to the first application resides in the first directory.

The system of the present invention may be used, for example, to manage first and second network directories in a manner that synchronizes equivalent entries in each directory. For example, the present invention may be used to migrate data between network directories affiliated with different messaging applications. Each messaging platform has its own directory, which often lacks interoperability, especially among different vendors. Users of one messaging platform, consequently, cannot access user and resource information from other directories managed by other messaging platforms. The present invention overcomes this lack of interoperability by synchronizing the entries among different directories.

In addition to messaging services, the benefits of the present invention may also be realized in other applications in which interoperability among directory services is at issue, such as Network Operating Systems and workflow applications.

These and other benefits of the present invention will be apparent from the detailed description that follows.

DETAILED DESCRIPTION OF THE INVENTION

It is to be understood that the figures and descriptions of the present invention have been simplified to illustrate elements that are relevant for a clear understanding of the present invention while eliminating, for purposes of clarity, other elements. For example, certain system details and modules of certain intelligent platforms are not described herein. Those of ordinary skill in the art will recognize, however, that these and other elements may be desirable in a typical communications network. A discussion of such elements is not provided because such elements are well known in the art and because they do not facilitate a better understanding of the present invention.

Figure 1:
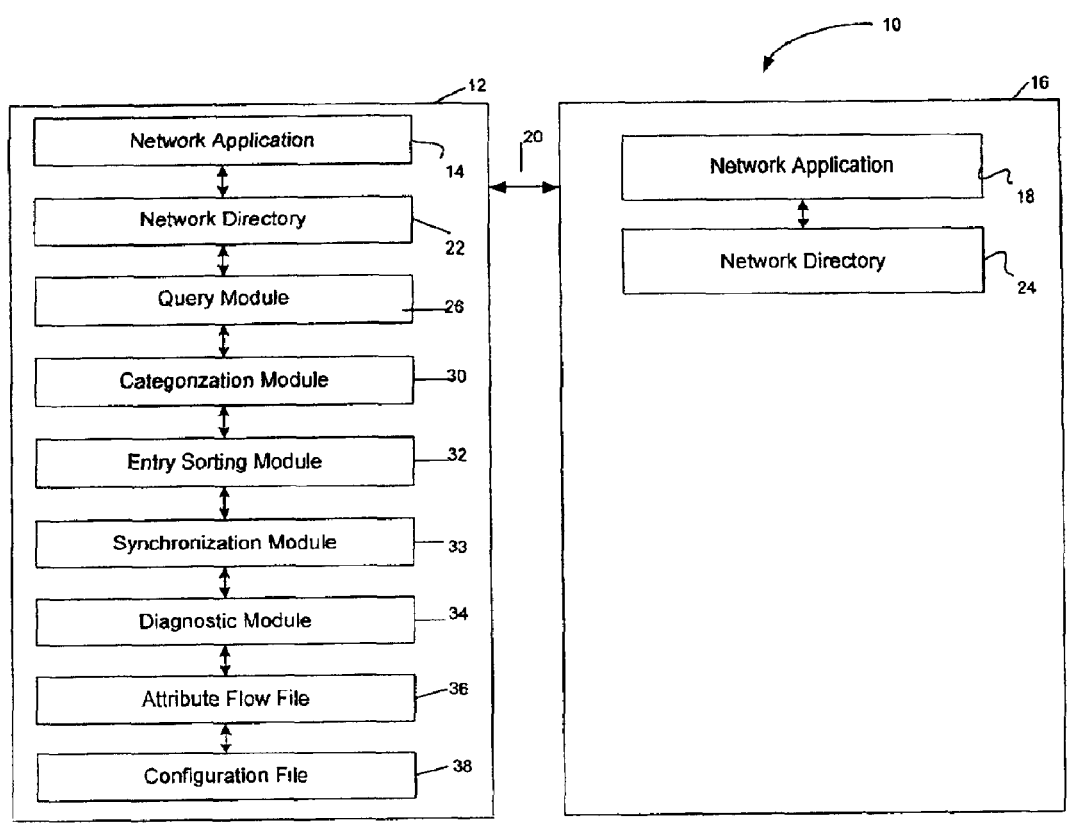
FIG. 1 is a block diagram of a system for managing network directories according to one embodiment of the present invention.

FIG. 1 is a block diagram of a network 10 that manages network directories according to one embodiment of the present invention. The network 10 employs two systems including a first system 12 running an instantiation of network application 14 and a second system 16 running an instantiation of network application 18. In this embodiment, systems 12 and 16 communicate over network connection 20 using TCP/IP or any appropriate data protocol. System 12, as discussed more fully below, includes a network directory 22 affiliated with network application 14. Likewise, system 16 includes a network directory 24 affiliated with network application 18. Both directories may store user and resource information. Systems 12 and 16 may be implemented on an intelligent platform such as, for example, a computer, such as a workstation or a personal computer, a microprocessor, a network server, or an application specific integrated circuit.

In one embodiment, system 12 comprises five modules for managing directories 22 and 24, including a query module 26, a synchronization module 33, a categorization module 30, an entry sorting module 32, and a diagnostic module 34. System 12 may also include data files 36, 38 that provide, for example, user-specified data to modules 26, 32, 33, and 34. Data files 36 and 38 may also reside on separate physical devices.

Figure 2:
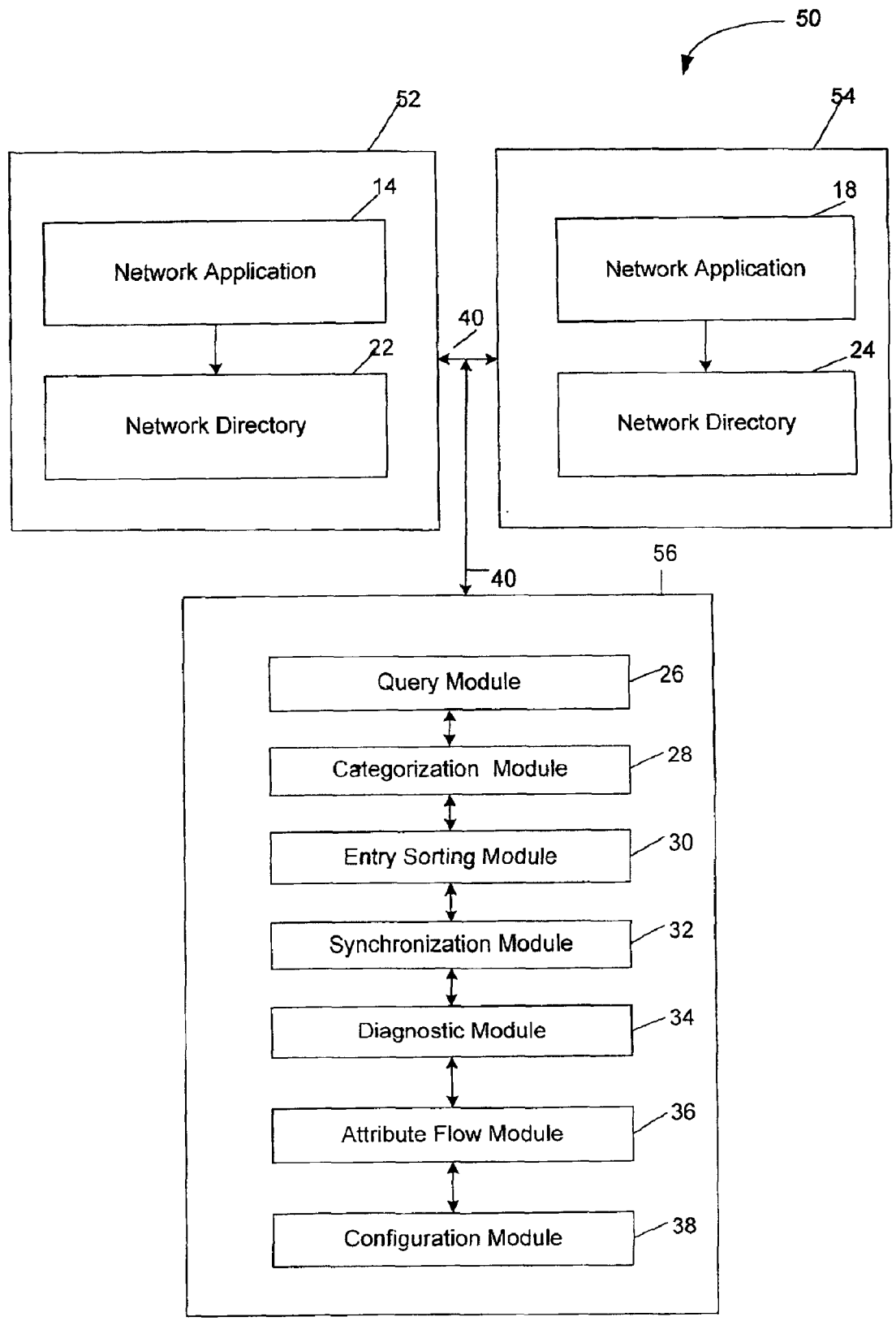
FIG. 2 is a block diagram of the system according to another embodiment of the present invention.

According to another embodiment, modules 26, 30, and, 32, and 33 may reside on separate physical devices, as illustrated in FIG. 2. In that embodiment, network 50 employs two systems including a first system 52 running an instantiation of network application 14, a second system 54 running an instantiation of network application 18, and a third system 56 running instantiations of each module and storing data files 36 and 38. In this embodiment, systems 52, 54, and 56 communicate over network connection 40 using any appropriate data protocol. Like the modules, data files 36 and 38 are equally location independent.

Modules 26, 30, 32, 33, and 34 may be implemented as software code to be executed by the systems 12 and 16 using any type of computer instruction suitable such as, for example, microcode, and may be stored in, for example, an electrically erasable programmable read only memory (EEPROM), or can be configured into the logic of the system. According to another embodiment, the modules may be implemented as software code to be executed by system 12 or system 16 using any suitable computer language such as, for example, Perl, sed, awk, UNIX shell scripts, Java, C or C++ using, for example, conventional or object-oriented techniques. In one embodiment, the modules are comprised of a Perl 5.005 script, using the supplemental PerLDAP modules 1.21 and LDAP SDK 3.0+for C that allow developers to easily write to and manage LDAP-enabled directories. The software code may be stored as a series of instructions or commands on a computer readable medium, such as random access memory (RAM), read only memory (ROM), a magnetic medium such as a hard-drive or a floppy disk, or an optical medium such as CD-ROM.

Network applications 14 and 16 can be any application that manages entries in a directory. In one embodiment, network applications 14 and 16 are messaging platforms that store user-related information in directories 22 and 24. In the messaging embodiment, each entry may represent a user where the fields associated with that entry contain, for example, the user's email address, phone number, and office location. Network applications 14 and 16 may store these data using a flat data architecture, where the structure resembles a phone directory. Generally, data stored using a flat architecture are accessible using proprietary utilities associated with the messaging application. One example of an application that uses a flat architecture is Hewlett Packard's OpenMail®. OpenMail® directories are easily accessible using HP proprietary utilities, such as OMSEARCH, OMADDENT, OMMODENT, and OMDELENT. In another embodiment, network applications 14 and 16 use a hierarchical structure accessible using the open source Lightweight Directory Access Protocol (LDAP), such as the Microsoft Exchange Server® Global Address List (GAL). Finally, in another embodiment, network 10 could include network directories using incompatible architectures, such as when one is LDAP-enabled while the other is not.

Query module 26 makes separate queries to directories 22 and 24 using an appropriate protocol for the directory architecture. For example, query module 26 could use LDAP for LDAP-enabled directories and other protocols for non-LDAP enabled directories, such as OMSEARCH for Open-Mail®. Categorization module 30 categorizes the entries in each directory by its native application. For example, if an Exchange directory contains entries native to Exchange and entries native to another messaging application, i.e. non-native to Exchange, the categorization module categorizes each entry according to its affiliated application. Entry sorting module 32 sorts the entries according to a user-specified field called a key. For example, entry sorting module 32 could be directed to sort each entry alphabetically according to a field containing last names. Finally, diagnostic module 34 records the differences between the directories in a log file, allowing system administrators to maintain a permanent record of the changes.

Attribute flow file 36 may contain user-specified fields that limit the amount of information returned from a search of the directory to those fields. For example, the attribute flow file may specify one or more directory attributes to be synchronized in directory 22 and, in the embodiment where the directories employ different architectures, the equivalent attribute in directory 24. Additionally, the attribute flow file may specify the direction in which the data should flow. Finally, attribute flow file 36 may include a flag that instructs the module whether or not to overwrite a field with blank data.

Configuration file 38 may include LDAP or other protocol-specific information for input to other modules. In one embodiment, the configuration file provides such protocol information as the name and location of the target system, the name of the target directory, and the name and location of user attribute file 36. The configuration file may also contain user-specified filter criteria that limit the search of the directory to those entries that satisfy the filter criteria.

According to one embodiment, network application 14 is affiliated with directory 22 having entries native to application 14. Likewise, network application 18 is affiliated with directory 24 having entries native to application 18. Note that an entry native to the first application is non-native to the second application and, conversely, an entry native to the second application is non-native to the first application. In some embodiments, directories 22 and 24 may contain both native and non-native entries. An entry is non-native when the entry is native to an application other than the application affiliated with the directory in which the entry resides. For example, directory 22 is affiliated with network application 14 but may contain entries native to network application 18, making those entries non-native. Likewise, directory 24 may contain entries native to network application 14, making those entries non-native.

Figure 3:
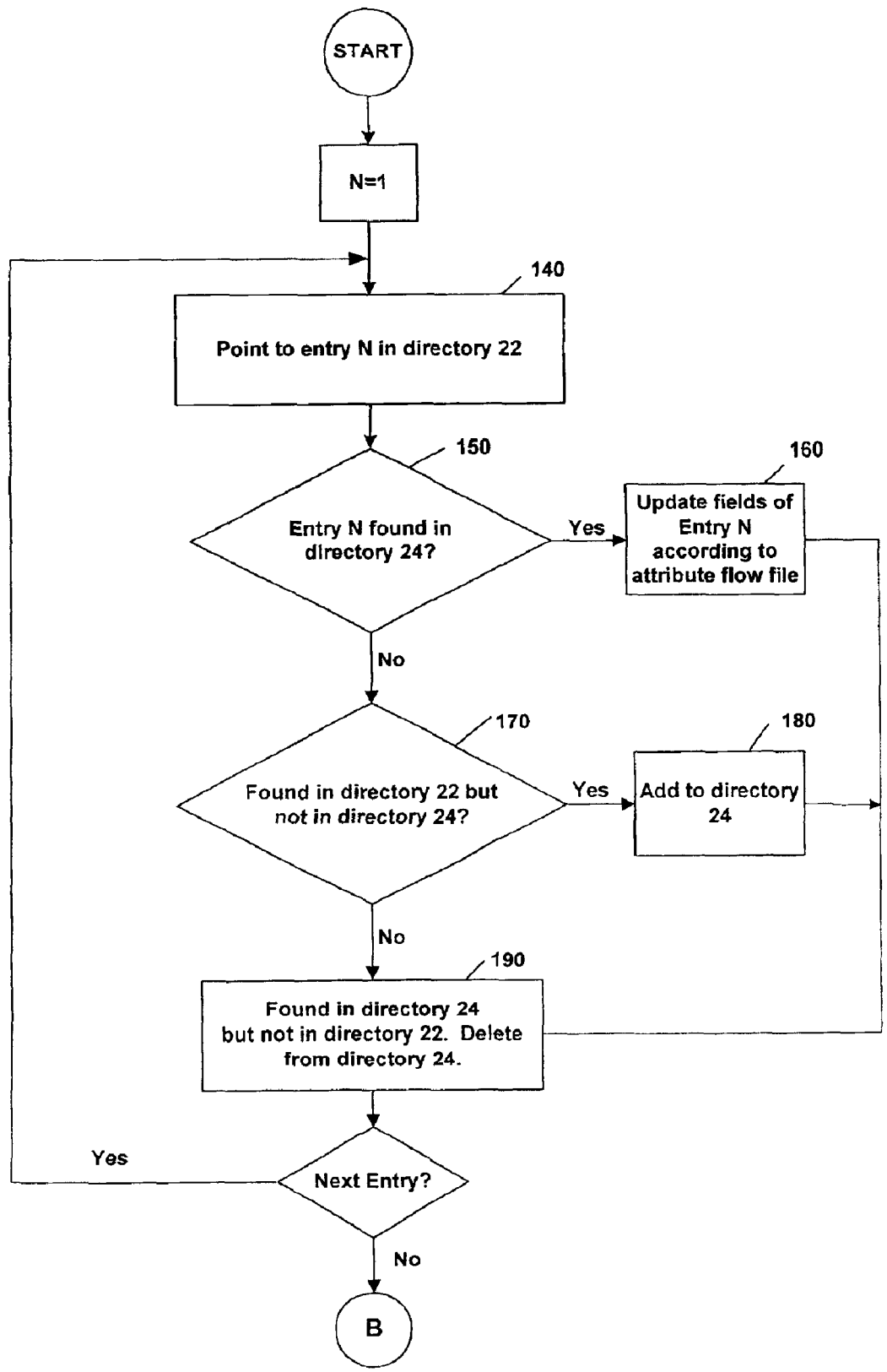
FIG. 3 and FIG. 4 are diagrams of the process flow through the synchronization module of the system of FIG. 1 according to one embodiment of the present invention.
Figure 4:
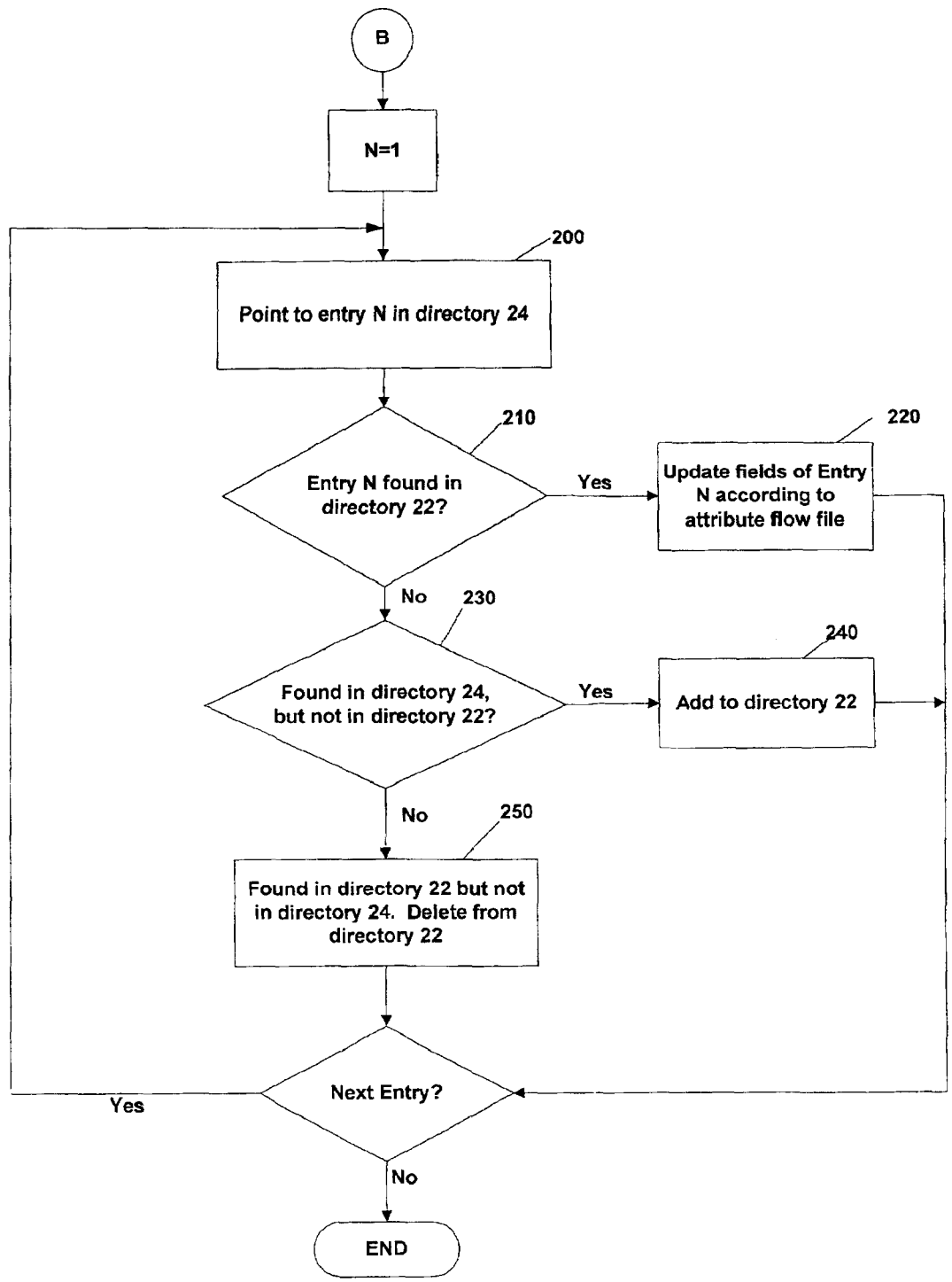

FIG. 3 and FIG. 4 illustrate the process by which synchronization module 33 synchronizes directory 22 with directory 24. First, FIG. 3 illustrates the process by which synchronization module 33 derives updates for directory 24. Synchronization module 33 compares a user-specified field for each native entry found in directory 22 to the user-specified field for each entry native to application 14 found in directory 24 (steps 140 and 150). If the user-specified fields or keys match, then synchronization module 33 compares the fields specified in the attribute flow file and, if necessary, updates that entry in directory 24 (step 160). Updating in this context means modifying directory entries. If the keys do not match, then the entry is either deleted from or added to directory 24. More specifically, if the entry is found in directory 22 but not in directory 24, then the entry is added to directory 24 (steps 170 and 180). If the entry is not found in directory 22 but found in directory 24, then the entry is deleted from directory 24 (steps 170 and 190).

FIG. 4 illustrates a similar process that updates directory 22 based on entries native to directory 24. Synchronization module 33 compares a user-specified field for each native entry found in directory 24 to the user-specified field for each entry native to application 18 found in directory 22 (steps 200 and 210). If the user-specified fields or keys match, then synchronization module 33 compares the fields specified in the attribute flow file and, if necessary, updates that entry in directory 22 (step 220). Again, updating in this context means modifying directory entries. If the keys do not match, then the entry is either deleted from or added to directory 22. More specifically, if the entry is found in directory 24 but not in directory 22, then the entry is added to directory 22 (steps 230 and 240). If the entry is not found in directory 24 but found in directory 22, then the entry is deleted from directory 22 (steps 250 and 260).

It should be understood that the invention is not limited by the foregoing description of preferred embodiments, but embraces all such alterations, modifications, and variations in accordance with the spirit and scope of the appended claims.

What is claimed is:

1. A system for managing first and second network directories, wherein the first network directory is affiliated with a first application and having entries native to the first application, and wherein the second network directory is affiliated with a second application and having entries native to the second application, and wherein an entry native to the first application is non-native to the second application, and wherein an entry native to the second application is non-native to the first application, the system comprising:

a query module for querying the entries of the first and second directories based on the native application of the entry; and a synchronization module in communication with the query module for updating entries in at least one of the first and second directories based on whether an entry native to the first application resides in the first directory.

2. The system of claim 1, further comprising:

a categorization module that categorizes entries in the first and second directories according to the native application of the entry.

3. The system of claim 1, further comprising:

an entry sorting module for sorting the entries in the first and second directories.

4. The system of claim 1, further comprising:

a data module for communicating user-specified information to the synchronization and query modules.

5. The system of claim 1, further comprising:

a diagnostic module for identifying differences in entries between the first and second directories.

6. The system of claim 1, wherein at least one of the first and second network directories are accessible using a Lightweight Directory Access Protocol.

7. The system of claim 1, wherein at least one of the first and second network directories are not accessible using a Lightweight Directory Access Protocol.

8. A network comprising:

a first network directory, wherein the first network directory is affiliated with a first application and having entries native to the first application;

a second network directory, wherein the second network directory is affiliated with a second application and having entries native to the second application, and wherein an entry native to the first application is non-native to the second application, and wherein an entry native to the second application is non-native to the first application;

a query module for querying the entries of the first and second directories based on the native application of the entry; and a synchronization module in communication with the query module for updating entries in at least one of the first and second directories based on whether an entry native to the first application resides in the first directory.

9. The network of claim 8, further comprising:

a categorization module that categorizes entries in the first and second directories according to the native application of the entry.

10. The network of claim 8, further comprising:

an entry sorting module for sorting the entries in the first and second directories.

11. The network of claim 8, further comprising:

a data module for communicating user-specified information to the synchronization module.

12. The network of claim 8, further comprising:

a diagnostic module for identifying differences in entries between the first and second directories.

13. A method for managing first and second network directories, wherein the first network directory is affiliated with a first application having entries native to the first application, and wherein the second network directory is affiliated with a second application and having entries native to the second application, and wherein an entry native to the first application is non-native to the second application, and wherein an entry native to the second application is non-native to the first application, the method comprising:

querying entries of the first and second directories based on the native application of the entry; and synchronizing entries by updating entries in at least one of the first and second directories based on whether an entry native to the first application resides in the first directory.

14. The method of claim 13 further comprising:

categorizing entries in the first and second directories according to the native application of the entry.

15. The method of claim 13, further comprising:

sorting the entries in the first and second directories.

16. The method of claim 13, further comprising:

communicating user-specified information to the synchronization module using one or more data files.

17. The method of claim 13, further comprising:

identifying differences in entries between the first and second directories.

18. A system for managing first and second network directories, wherein the first network directory is affiliated with a first application and having entries native to the first application, and wherein the second network directory is affiliated with a second application and having entries native to the second application, and wherein an entry native to the first application is non-native to the second application, and wherein an entry native to the second application is non-native to the first application, comprising:

means for querying entries of the first and second directories based on the native application of the entry; and means for synchronizing the entries by updating entries in at least one of the first and second directories based on whether an entry native to the first application resides in the first directory.

19. The system of claim 18 further comprising:

means for categorizing entries in the first and second directories according to the native application of the entry.

20. The system of claim 18, further comprising:

means for sorting the entries in the first and second directories.

21. The system of claim 18, further comprising:

means communicating user-specified information to the synchronization module using one or more data files.

22. The system of claim 18, further comprising:

means for identifying differences in entries between the first and second directories.

23. A computer-readable medium having stored thereon instructions which, when executed by a processor, performs the steps of:

querying entries of a first and second directory based on a native application of an entry wherein the first network directory is affiliated with a first application having entries native to the first application, and wherein the second network directory is affiliated with a second application and having entries native to the second application, and wherein an entry native to the first application is non-native to the second application, and wherein an entry native to the second application is non-native to the first application; and synchronizing entries by updating entries in at least one of the first and second directories based on whether an entry native to the first application resides in the first directory.

24. The method of claim 23 further comprising:

categorizing entries in the first and second directories according to the native application of the entry.

25. The method of claim 23, further comprising:

sorting the entries in the first and second directories.

26. The method of claim 23, further comprising:

communicating user-specified information to the synchronization module using one or more data files.

27. The method of claim 23, further comprising:

identifying differences in entries between the first and second directories.

* * * * *